(12) United States Patent
Ohnuma et al.

(10) Patent No.: US 6,700,253 B1
(45) Date of Patent: Mar. 2, 2004

(54) MOTOR AND PRODUCTION METHOD OF MOTOR

(75) Inventors: Nobuto Ohnuma, Kanagawa (JP); Toru Yosizawa, Kanagawa (JP); Osamu Watanabe, Kanagawa (JP)

(73) Assignee: Tokyo R & D Co., Ltd., Tokyo (JP)

( * ) Notice: Subject to any disclaimer, the term of this patent is extended or adjusted under 35 U.S.C. 154(b) by 200 days.

(21) Appl. No.: 10/031,394

(22) PCT Filed: Jul. 14, 2000

(86) PCT No.: PCT/JP00/04771

§ 371 (c)(1),
(2), (4) Date: Jan. 18, 2002

(87) PCT Pub. No.: WO01/28073

PCT Pub. Date:Apr. 19, 2001

(30) Foreign Application Priority Data

| Jul. 19, 1999 | (JP) | ............................................ 11/204966 |
| Oct. 4, 1999 | (JP) | ............................................ 11/282309 |

(51) Int. Cl.⁷ ................................................. H02K 5/00
(52) U.S. Cl. ............................. 310/89; 310/99; 310/33
(58) Field of Search ................................ 310/89, 99, 33

(56) References Cited

U.S. PATENT DOCUMENTS

| 5,939,807 A | * | 8/1999 | Patyk | ............................ 310/89 |
| 6,081,056 A | * | 6/2000 | Takagi et al. | .................. 310/89 |
| 6,204,582 B1 | * | 3/2001 | Keller | ............................ 310/89 |

* cited by examiner

*Primary Examiner*—Burton S. Mullins
*Assistant Examiner*—Iraj A. Mohandesi
(74) *Attorney, Agent, or Firm*—Kanesaka & Takeuchi (57) ABSTRACT

The present invention is a motor which has a motor casing (5) and a reduction gearing casing (7) integrally formed, a hole (8) formed on a portion shared by these casings, through which an output shaft (3*a*) of a rotor (3) extends from the motor casing side to the reduction gearing casing side, and a lubrication oil (9) filling the reduction gearing casing. And, a method for producing a motor comprises the step of charging a resin (11) into and curing it in the motor casing to adhere the resin to a coil of an armature and the inner surface of the motor casing. Besides, the motor casing (5) has a first casing member (510), a second casing member (520) and a third casing member (530) for covering a control section (4), and the first casing member is assembled with the second casing member, and the first casing member is assembled with the third casing member.

7 Claims, 9 Drawing Sheets

MOTOR AND PRODUCTION METHOD OF MOTOR

TECHNICAL FIELD

The present invention relates to a motor comprising an armature, a rotor and a motor casing for holding them and a method for producing the motor.

BACKGROUND ART

Generally, a DC motor or a DC brushless motor is used as a motor engine for vehicles such as electric vehicles and electric scooters. Such a type of motor includes an armature, a rotor and a motor casing for holding the armature and bearings for the rotor, and the armature and the rotor are disposed on the motor casing.

With recent progress of the control technology and enhancement of the performance of permanent magnets, the achievement of high rotations and high torque has become possible for the aforesaid motor. As a result, problems of connection accuracy between an output shaft of a rotor and a reduction gearing, coaxiality between an armature and a rotor, and heat radiation of a coil wound around the armature have become significant issues in satisfactorily securing the performance of the motor.

Under the circumstances described above, it is an object of the present invention to provide a motor which can provide output more efficiently and a method for producing the motor.

As the motor for the aforesaid running motor engine, there is proposed, for example, Japanese Patent Application Laid-Open Publication No. Hei 10-234158 which describes an electric motor including an armature, a rotor, a control section for controlling the armature and a motor casing for holding them.

Thus, the motor casing is configured to hold the control section together. Therefore, it is easy to secure an installing space and to mount the motor as compared with a design that the control section is separately provided.

The motor used for the aforesaid running motor engine or the like needs the motor casing to have airtightness in order to prevent water and dust from entering from outside.

But, because the motor casing which holds the armature, the rotor and the control section is generally configured by assembling a plurality of members respectively covering the armature, the rotor and the control section, it has many joints which are in contact with outside and, therefore, a disadvantage in securing airtightness.

In view of the aforesaid problems, it is an object of the present invention to provide a motor having the airtightness of the motor casing improved further more.

DISCLOSURE OF THE INVENTION

The invention described in claim 1 is a motor comprising an armature, a rotor and a motor casing for holding the armature and a bearing for the rotor, characterized by a reduction gearing consisting of a train of gears connected to an output shaft of the rotor and a reduction gearing casing for holding the reduction gearing, the motor casing being integrally provided with the reduction gearing casing, a hole, through which the output shaft is extended from the motor casing side to the reduction gearing casing side, being formed on a portion shared by these casings, and a lubrication oil filling the reduction gearing casing.

Thus, the motor of claim 1 has the reduction gearing consisting of the train of gears connected to the output shaft of the rotor and the reduction gearing casing for holding the reduction gearing, the motor casing is integrally provided with the reduction gearing casing, the hole, through which the output shaft being extended from the motor casing side to the reduction gearing casing side, formed on the portion shared by these casings, and the lubrication oil filling the reduction gearing casing. Therefore, the armature, the rotor, the bearing and the reduction gearing are accurately arranged, smoothness of the reduction gearing is secured by the lubrication oil, and power of the motor is obtained more efficiently.

If the motor casing and the reduction gearing casing have different bodies, the number of components increases, and the manufacturing cost rises. In addition, when the output shaft and the reduction gearing are mutually connected, their fitting positions and angles tend to have a subtle deviation, resulting in possible lowering of the power. But, the present invention avoids such problems without fail.

The invention described in claim 2 is the motor according to claim 1, wherein the bearing for the rotor and an oil seal for sealing the lubrication oil are placed in the hole, and the bearing is immersed in the lubrication oil.

In the motor of claim 2, the bearing for the rotor and the oil seal for sealing the lubrication oil are placed in the hole, and the bearing is immersed in the lubrication oil. Therefore, smoothness of the bearing for the rotor can be secured by the lubrication oil filling in the reduction gearing casing.

The invention described in claim 3 is a motor comprising an armature, a rotor and a motor casing for holding the armature and a bearing for the rotor, wherein the motor casing is configured by assembling a plurality of members, and at least one of the plurality of members supports the bearing and the inner diameter section of the armature.

Thus, in the motor of claim 3, the motor casing comprises the plurality of members assembled, and at least one of the plurality of members supports the bearing and the inner diameter section of the armature. Therefore, the center axis of the armature and the center axis of the rotor can be aligned accurately, and power of the motor can be obtained more efficiently.

Specifically, when the plurality of members are assembled to form the motor casing, clearances and dimensional errors of the respective members are accumulated, possibly degrading coaxiality between the armature and the rotor and adversely effecting on the motor performance. But, such a drawback can be avoided without fail because at least one of the members of the present invention supports the bearing and the inner diameter part of the armature.

The invention described in claim 4 is a motor comprising an armature, a rotor and a motor casing for holding the armature and a bearing for the rotor, wherein a resin is charged into and cured in the motor casing to adhere to a coil of the armature and the inner surface of the motor casing.

Thus, according to the motor of claim 4, the resin is charged into and cured in the motor casing to adhere to the coil of the armature and the inner surface of the motor casing. Therefore, heat radiation of the coil of the armature can be secured sufficiently. As a result, power of the motor can be obtained more efficiently.

Especially, when the resin is provided to secure the heat radiation of the coil of the armature, a metal mold corresponding to the inner surface of the motor casing was conventionally used to form the resin around the coil of the armature, and the formed unit was fitted to the motor casing.

Therefore, adhesion between the resin and the inner surface of the motor casing was poor, and its heat radiation was insufficient. Accordingly, the present invention charges the resin into the motor casing for curing it therein, so that the resin and the inner surface of the motor casing can be adhered securely, and heat radiation can be improved. And, the conventional metal mold is not needed to form the resin.

The invention described in claim 5 is a method for producing a motor comprising an armature, a rotor and a motor casing for holding the armature and a bearing for the rotor, comprises the step of: charging a resin into and curing in the motor casing to adhere the resin to a coil of the armature and the inner surface of the motor casing.

Thus, according to the method for producing the motor of claim 5, the resin is charged into and cured in the motor casing, to adhere to the coil of the armature and the inner surface of the motor casing, so that the heat radiation of the coil of the armature can be secured satisfactorily. As a result, power of the motor can be obtained more efficiently.

Especially, when the resin is disposed to secure the heat radiation of the coil of the armature, a metal mold corresponding to the inner surface of the motor casing was conventionally used to form the resin around the coil of the armature, and the formed unit was fitted to the motor casing. Therefore, adhesion between the resin and the inner surface of the motor casing was poor, and its heat radiation was insufficient. Accordingly, the present invention charges the resin into and cures it in the motor casing, so that the resin and the inner surface of the motor casing can be adhered more securely, and heat radiation can be improved. And, the conventional metal mold is not needed to form the resin.

The invention described in claim 6 is the method for producing a motor according to claim 5, wherein when the resin is charged into the motor casing, a core for securing a space for placing the rotor is inserted into the motor casing.

Thus, the method for producing the motor of claim 6 charges the resin into the motor casing with the core for securing the space, in which the rotor is disposed, inserted into the motor casing, so that the rotor and the resin can be disposed efficiently.

The invention described in claim 7 is the method for producing a motor according to claim 6, wherein the motor is provided with a rotation sensor for detecting a rotation position of the rotor, and the core secures a space for placing the rotation sensor.

As described above, according to the method for producing the motor of claim 7, the motor is provided with the rotation sensor for detecting a rotation position of the rotor, and the core secures the space for disposing the rotation sensor. Thus, the rotation sensor can be disposed efficiently.

The invention described in claim 8 is a motor comprising an armature, a rotor, a control section for controlling the armature and a motor casing for holding them, wherein the motor casing includes a first casing member and a second casing member which cover the armature and the rotor and are respectively provided with bearings for the rotor and a third casing member for covering the control section, the first casing member and the third casing member are assembled to form an outer shell of the motor, the first casing member and the second casing member are assembled to divide the inside of the motor, and seating surfaces to be mutually contacted are respectively formed on ends of the first casing member and the third casing member.

According to the motor of claim 8, airtightness of the motor casing is improved further more.

Specifically, the motor casing for holding the armature, the rotor and the control section is configured by assembling a plurality of members which respectively cover the armature, the rotor and the control section, so that there are many joints which are exposed to outside, and it is disadvantageous in view of securing airtightness. In the present invention, however, the joint between the first casing member and the second casing member is located inside the joint between the first casing member and the third casing member, so that airtightness can be secured relatively easily.

And, the first casing member and the third casing member can be assembled accurately by virtue of the seating surfaces respectively formed thereon, and a gap in the joint can be eliminated without fail.

The invention described in claim 9 is the motor according to claim 8, wherein a through section is disposed on the second casing member through which to pass the wiring for connecting the armature with the control section.

According to the motor of claim 9, the wiring for connecting the armature and the control section within the motor casing can be arranged efficiently.

The invention described in claim 10 is the motor according to claim 8 or 9, wherein a substrate of the control section is supported by the second casing member.

According to the motor of claim 10, the control section can be arranged efficiently in the motor casing.

The invention described in claim 11 is the motor according to any of claims 8 to 10, wherein a sensor for detecting a position of the rotor is supported by the second casing member.

According to the motor of claim 11, the sensor for detecting a position of the rotor can be disposed efficiently in the motor casing.

BEST MODE FOR CARRYING OUT THE INVENTION

Embodiments of the present invention will be described in detail with reference to the accompanying drawings.

Figure 1:
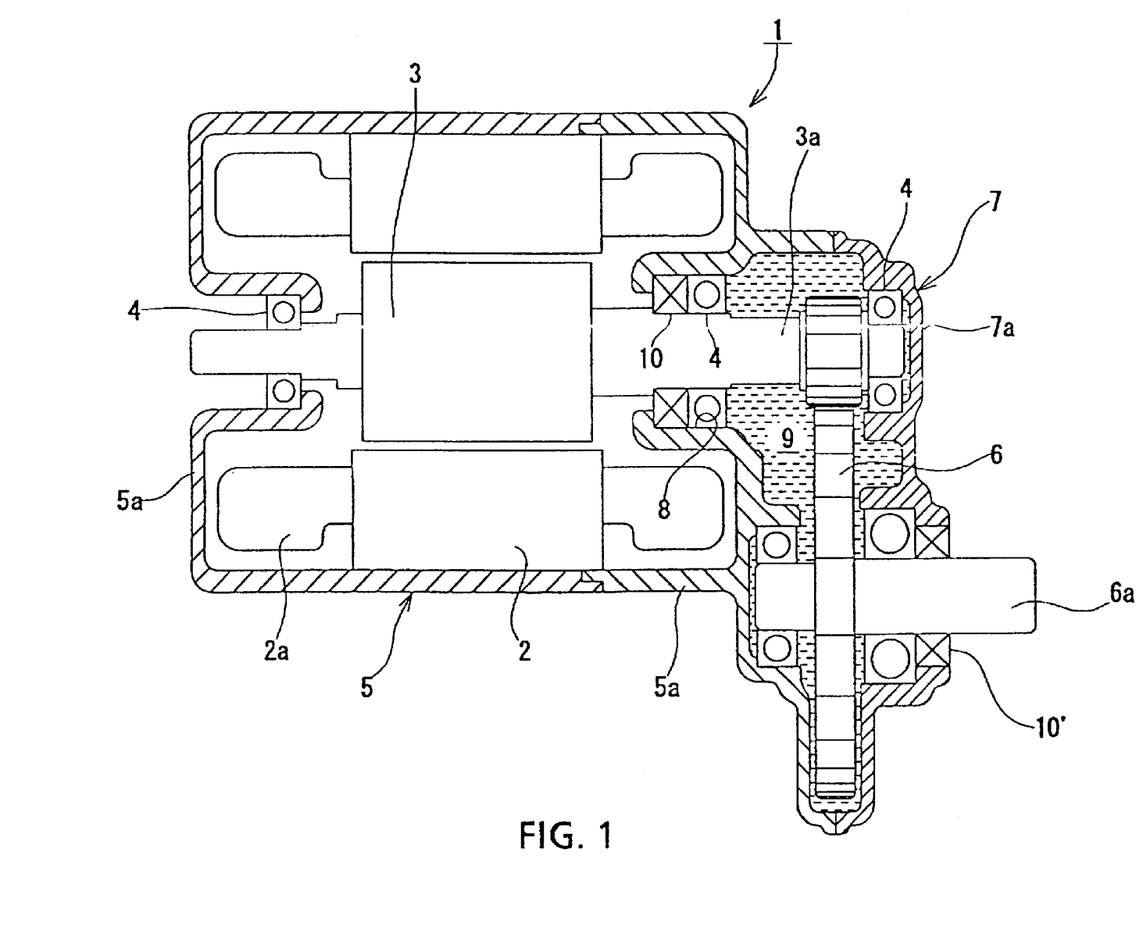
FIG. 1 is a sectional view showing a motor according to an embodiment of the present invention.

As shown in FIG. 1, a motor 1 of this embodiment is a DC brushless motor configuring a motor engine for vehicles and comprises an armature 2, a rotor 3 which rotates inside the armature 2, a motor casing 5 which holds the armature 2 and bearings 4, 4 for the rotor 3, a reduction gearing 6 consisting of a train of gears and connected to an output shaft 3a the rotor 3, and a reduction gearing casing 7 for holding the reduction gearing 6. In the drawing, 2a indicates a coil wound around the armature 2.

The motor 1 has an unillustrted battery as its power source, and it is configured that its output shaft 3a has the number of revolutions of about 100,00 [rpm] and can output torque of about nine [Newton] by controlling a weak field.

As shown in the same drawing, the motor casing 5 and the reduction gearing casing 7 are integrally formed, and a portion shared by these casings is provided with a hole 8 through which the output shaft 3a extends from the motor casing 5 side to the reduction gearing casing 7 side. And, lubrication oil 9 filling the reduction gearing casing 7.

The reduction gearing 6 is configured by providing a plurality of mutually meshed gears, and its output portion 6a is protruded from an essential portion of the reduction gearing casing 7 where an oil seal 10 is placed to seal the lubrication oil 9. Smoothness of the reduction gearing 6 can be secured by the lubrication oil 9.

The motor casing 5 and the reduction gearing casing 7 are configured by bolting a pair of members 5a, 5a, which form a cylindrical interior, with a member 7a which is fitted to the members 5a, 5a.

Figure 2:
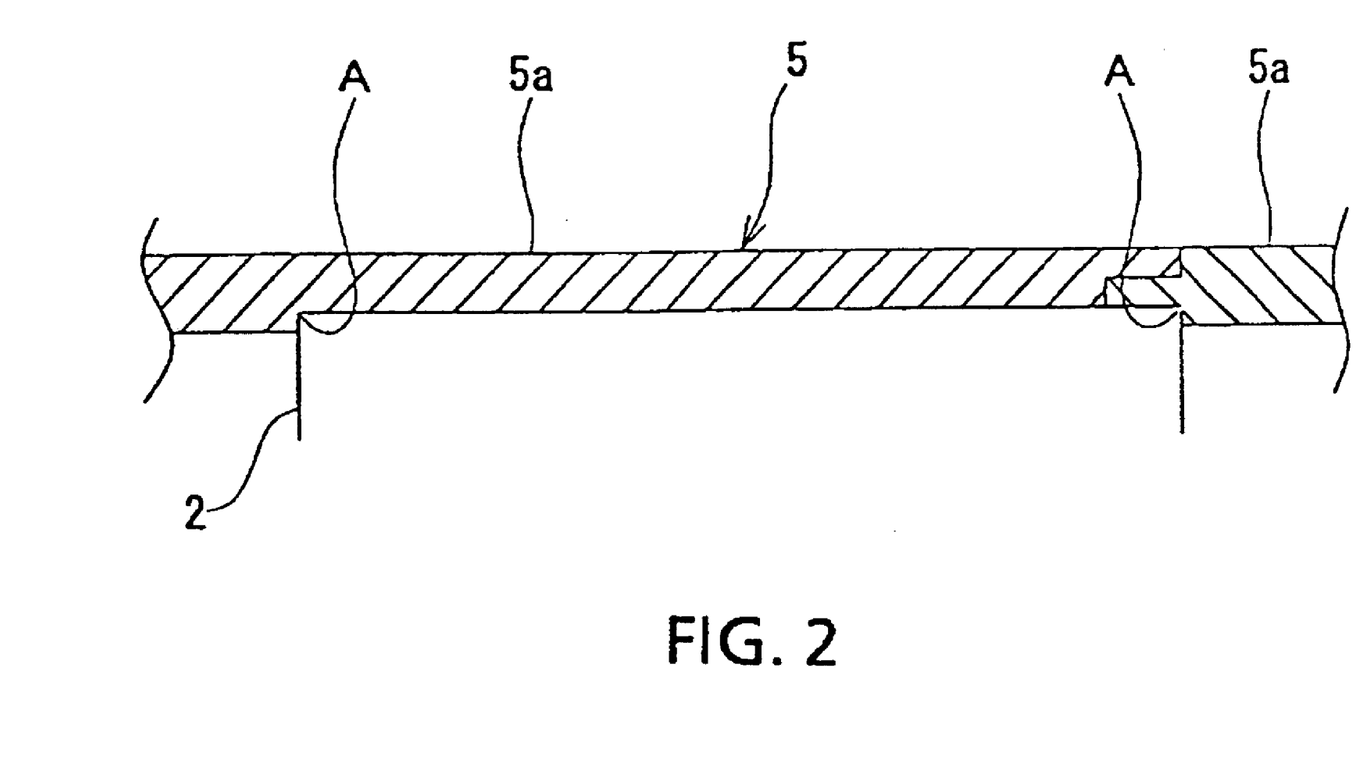
FIG. 2 is a sectional view showing important portions of a motor casing and an armature according to the embodiment of the present invention.

As shown in FIG. 2, the armature 2 is fitted between stepped portions A and A which are respectively formed on the pair of members 5a, 5a.

One of the bearings 4, 4 for the rotor 3 and an oil seal 10 for sealing the lubrication oil 9 are disposed in the hole 8, and this bearing 4 is immersed in the lubrication oil 9. The other bearings 4, 4 are respectively disposed in appropriate positions of the motor casing 5 and the reduction gearing casing 7, and these in the motor casing 5 are greased for lubrication.

Specifically, the bearing 4 placed in the hole 8 receives a relatively large load when torque is transmitted, so that it is designed to be somewhat larger than the other bearings 4, 4 and immersed in the lubrication oil 9 so to operate smoothly.

As described above, the motor of this embodiment has the reduction gearing consisting of the train of gears and connected to the output shaft of the rotor and the reduction gearing casing for holding the reduction gearing, the motor casing and the reduction gearing casing are integrally formed, the hole is formed on the portion shared by these casings, through which the output shaft extends from the motor casing side to the reduction gearing casing side, and the lubrication oil is filling in the reduction gearing casing. Thus, the armature, the rotor, the bearing and the reduction gearing can be disposed accurately, smoothness of the reduction gearing and the bearings can be secured by the lubrication oil, and the motor output can be obtained more efficiently.

If the motor casing and the reduction gearing casing are separate bodies, the number of components increases, resulting in the increase of manufacturing costs. And, when the output shaft and the reduction gearing are mutually connected, their mounting positions and angles tend to be slightly misaligned. Thus, power might be lowered, but such drawbacks can be avoided by this embodiment without fail.

In the motor of this embodiment, the bearing for the rotor and the oil seal for sealing the lubrication oil are disposed in the hole, and the bearing is immersed in the lubrication oil. Accordingly, smoothness of the bearing for the rotor can be secured by the lubrication oil which fills in the reduction gearing casing.

Then, a second embodiment of the present invention will be described with reference to FIG. 3 and FIG. 4. This motor has the same basic structure as that of the motor described in the aforesaid embodiment, so that like reference numerals are used for the common members, and their descriptions are omitted.

Figure 3:
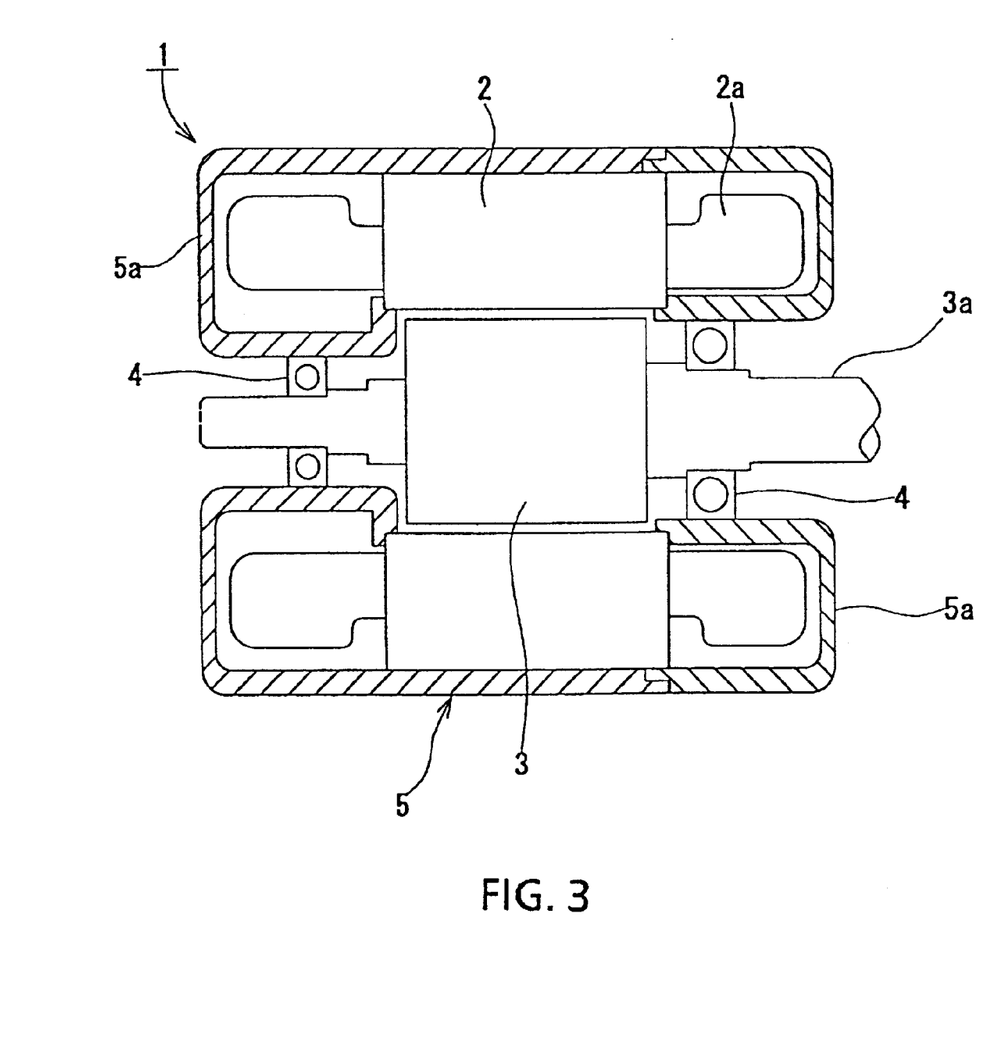
FIG. 3 is a sectional view showing a motor according to an embodiment of the present invention.

As shown in FIG. 3, the motor casing 5 of this embodiment comprises a plurality of members 5a, 5a which are assembled, and the members 5a, 5a are configured to support the bearing 4 and the inner diameter part of the armature 2.

Specifically, the bearing 4 and the inner diameter part of the armature 2 are respectively positioned with respect to the respective members 5a, 5a configuring the motor casing 5. As a result, the center axis of the armature 2 and the center axis of the rotor 3 are aligned accurately.

A reduction gearing may be fitted to the output shaft 3a of the rotor 3 in the same way as in the aforesaid embodiment.

Figure 4:
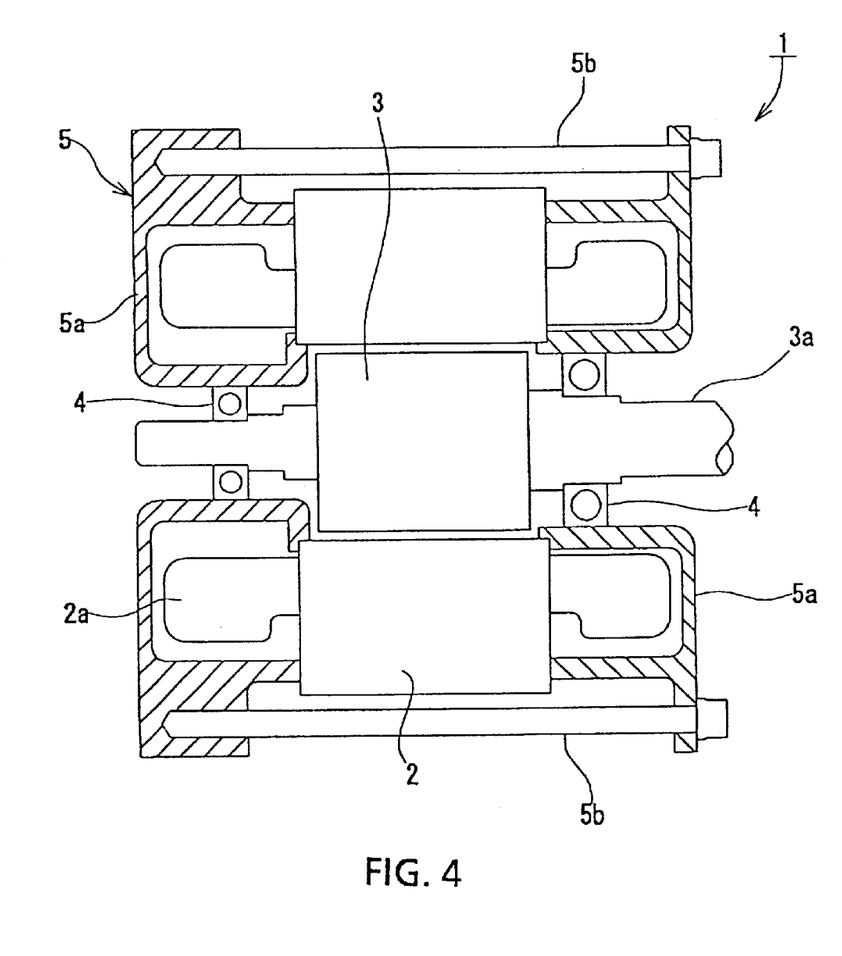
FIG. 4 is a sectional view showing a motor according to the embodiment of the present invention.

FIG. 3 shows an example that the armature 2 is thoroughly housed in the motor casing 5, but as shown in FIG. 4, the outer diameter part of the armature 2 may be exposed to the outside of the motor casing 5. The motor casing 5 shown in FIG. 4 is assembled by having the leading ends of bolts 5b and 5b, which are inserted through one of the members 5a, 5a, screwed with the other member 5a.

As described above, in the motor of this embodiment, the motor casing is configured by assembling a plurality of members, and at least one of the plurality of members supports the bearing and the inner diameter part of the armature. Therefore, the center axis of the armature and the center axis of the rotor can be aligned accurately, and power of the motor can be obtained more efficiently.

In other words, when the plurality of members are assembled to form the motor casing, clearances and dimensional errors of the respective members are accumulated, possibly degrading the coaxiality between the armature and the rotor and adversely effecting on the motor performance. But, such drawbacks can be avoided without fail because at least one of the members of this embodiment supports the bearing and the inner diameter part of the armature.

Then, a third embodiment of the present invention will be described with reference to FIG. 5 and FIG. 6. This motor has the same basic structure as that of the motor described in the aforesaid embodiment. Therefore, like reference numerals are used for the common members, and their descriptions are omitted.

Figure 5:
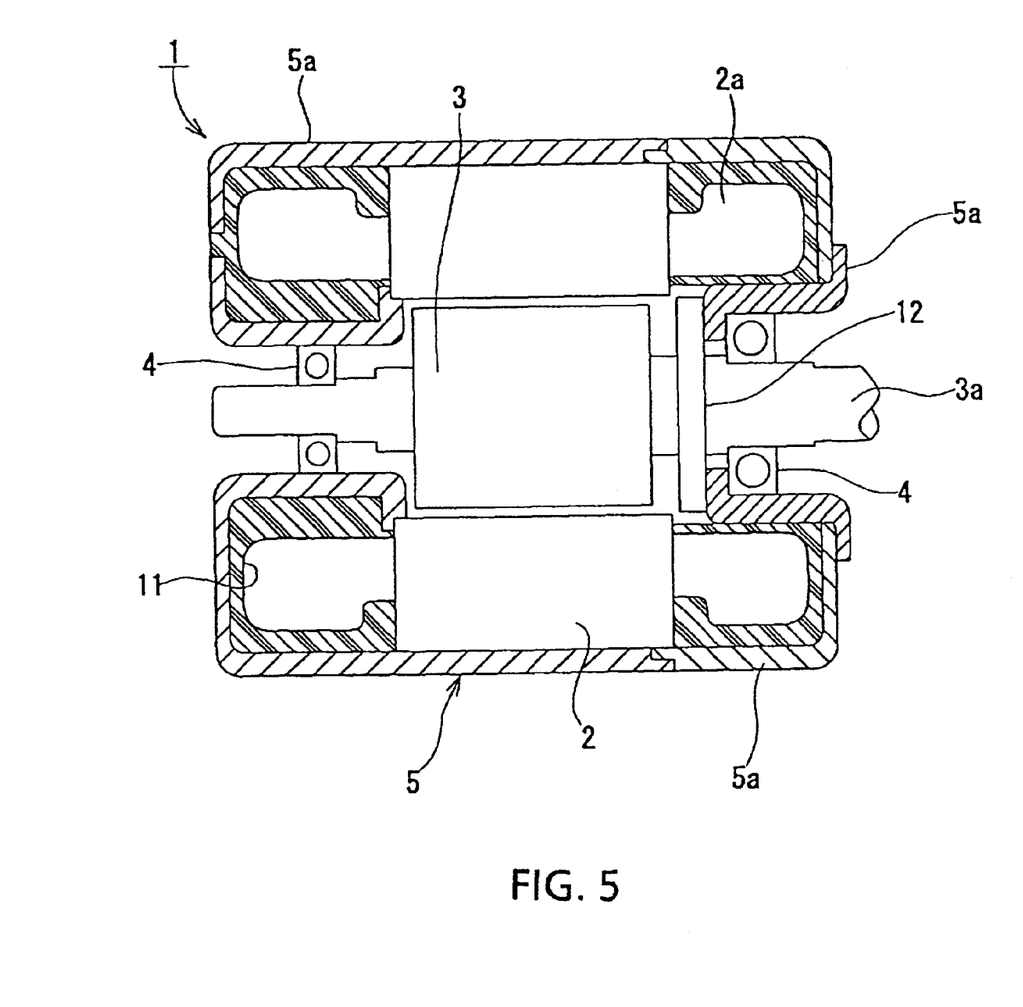
FIG. 5 is a sectional view showing a motor according to an embodiment of the present invention.

As shown in FIG. 5, the motor 1 of this embodiment has a resin 11 charged into and cured in the motor casing 5 so to adhere the resin 11 to the coil 2a of the armature 2 and the inner surface of the motor casing 5. In the drawing, 12 indicates a rotation sensor for detecting a rotation position of the rotor 3.

The resin 11 is preferably to be a resin capable of improving heat radiation of the coil 2a. Specifically, silicon based resin or epoxy based resin, which is a high heat conductive and uncured hardening resin, is optimum. As the silicon based resin, commercially available two-part silicon potting agents (e.g., Three Bond 1230 etc. manufactured by Three Bond Co., Ltd.) are suitable. And, as the epoxy based resin, a one-can epoxy-blended resin (e.g., Three Bond 2200 Series etc. manufactured by Three Bond Co., Ltd.) is suitable.

For the two-part silicon potting agent, a silicon resin and a hardening agent are generally provided separately. Therefore, the silicon potting agent cures at room temperature by mixing the silicon resin and the curing agent immediately before charging them into the motor casing 5. By appropriately heating as required, hardening time can be decreased, and hardening and adhesion can be effected more efficiently.

On the other hand, the one-can epoxy-blended resin has a relatively low viscosity, so that it can be adhered to the inner surface of the motor casing 5 by charging it into the motor casing 5 and heat hardening.

The resin used in this embodiment has been described with reference to the two types of resins as above. It is to be understood, however, that the resins used by the invention are not limited to the aforesaid resins but other appropriate resins may be used.

Figure 6:
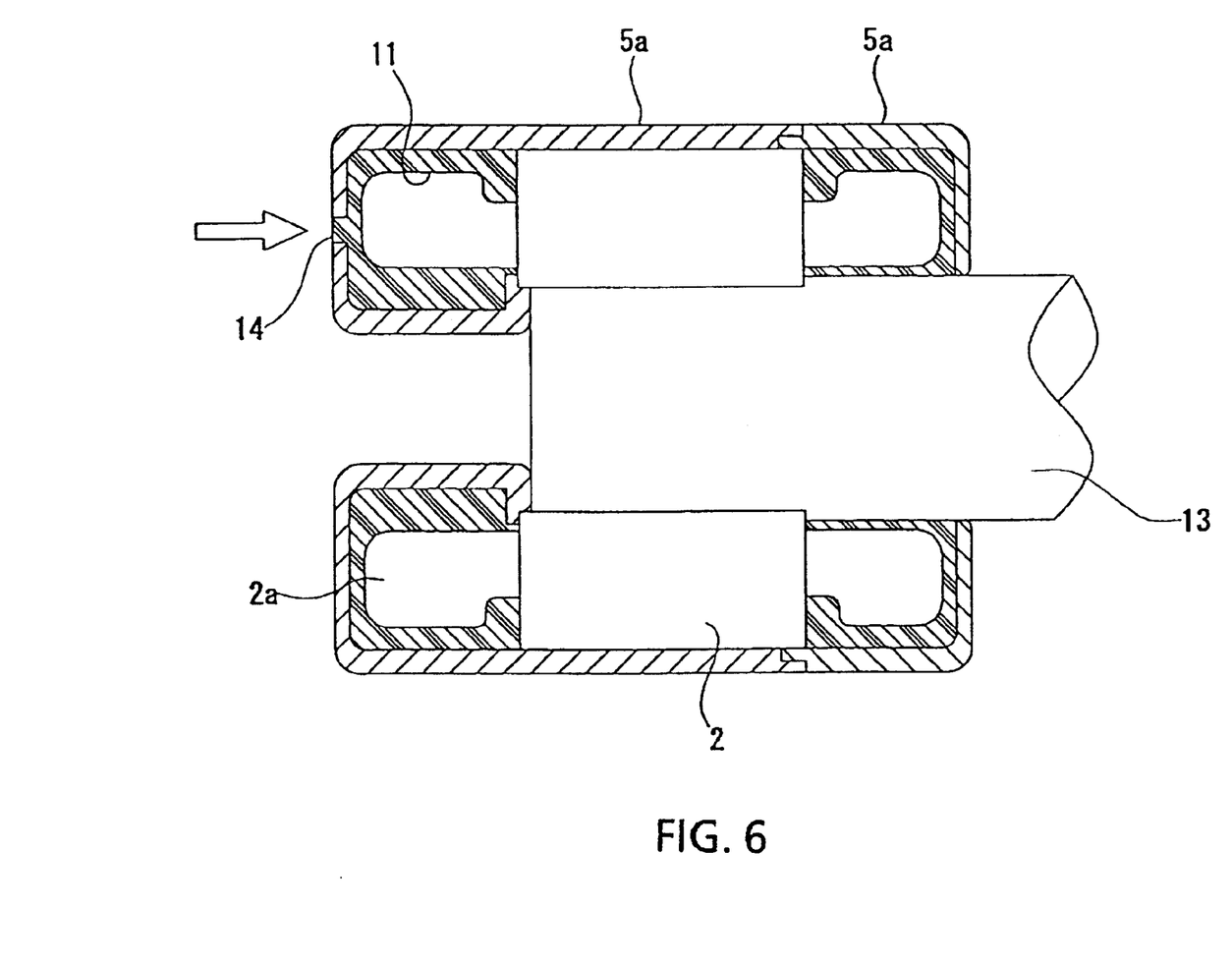
FIG. 6 is an explanatory diagram showing a method for producing a motor according to the embodiment of the present invention.

To charge the resin 11 into the motor casing 5, a core 13 for securing a space, in which the rotor 3 and the rotation sensor 12 are disposed, is inserted into the motor casing 5 as shown in FIG. 6.

The resin 11 is charged through a hole 14 formed on the motor casing 5 as indicated by an arrow in the same drawing. This hole is formed by one or two or more at appropriate positions.

And, the rotor 3, the rotation sensor 12 and one of the members 5a configuring the motor casing 5 are disposed after curing the resin 11 and removing the core. The member 5a disposed here closes an opening for putting in and out of the core 13, and especially the bearing 4 for the rotor 3 is disposed in it, and the output shaft 3a of the rotor 3 is placed through it.

The reduction gearing may be mounted to the output shaft 3a of the rotor 3 as described in the aforesaid embodiment. And, the same resin as used in the aforesaid embodiment may be used.

As described above, in the motor of this embodiment, the resin is charged into and cured in the motor casing to adhere to the coil of the armature and the inner surface of the motor casing. Therefore, the heat radiation of the coil of the armature can be secured satisfactorily. As a result, power of the motor can be obtained more efficiently.

Especially, when the resin is disposed to secure the heat radiation of the coil of the armature, a metal mold corresponding to the inner surface of the motor casing was conventionally used to form the resin around the coil of the armature, and the formed unit was fitted to the motor casing. Therefore, adhesion between the resin and the inner surface of the motor casing was poor, and its heat radiation was insufficient. Therefore, this embodiment charges the resin into and cures it in the motor casing, so that the resin and the inner surface of the motor casing can be adhered securely, and heat radiation can be improved. And, the conventional metal mold is not needed to form the resin.

According to the method for producing the motor of this embodiment, the resin is charged into and cured in the motor casing to adhere the resin to the coil of the armature and the inner surface of the motor casing, so that the heat radiation of the coil of the armature can be secured satisfactorily. As a result, power of the motor can be obtained more efficiently.

Besides, according to the method for producing the motor of this embodiment, to charge the resin into the motor casing, the core for securing the space, in which the rotor is disposed, is inserted into the motor casing, so that the rotor and the resin can be disposed efficiently.

In addition, according to the method for producing the motor of this embodiment, the motor is provided with a rotation sensor for detecting a rotation position of the rotor, and the core secures the space for disposing the rotation sensor. Thus, the rotation sensor can be disposed efficiently.

Then, a fourth embodiment of the present invention will be described in detail with reference to the drawings.

Figure 7:
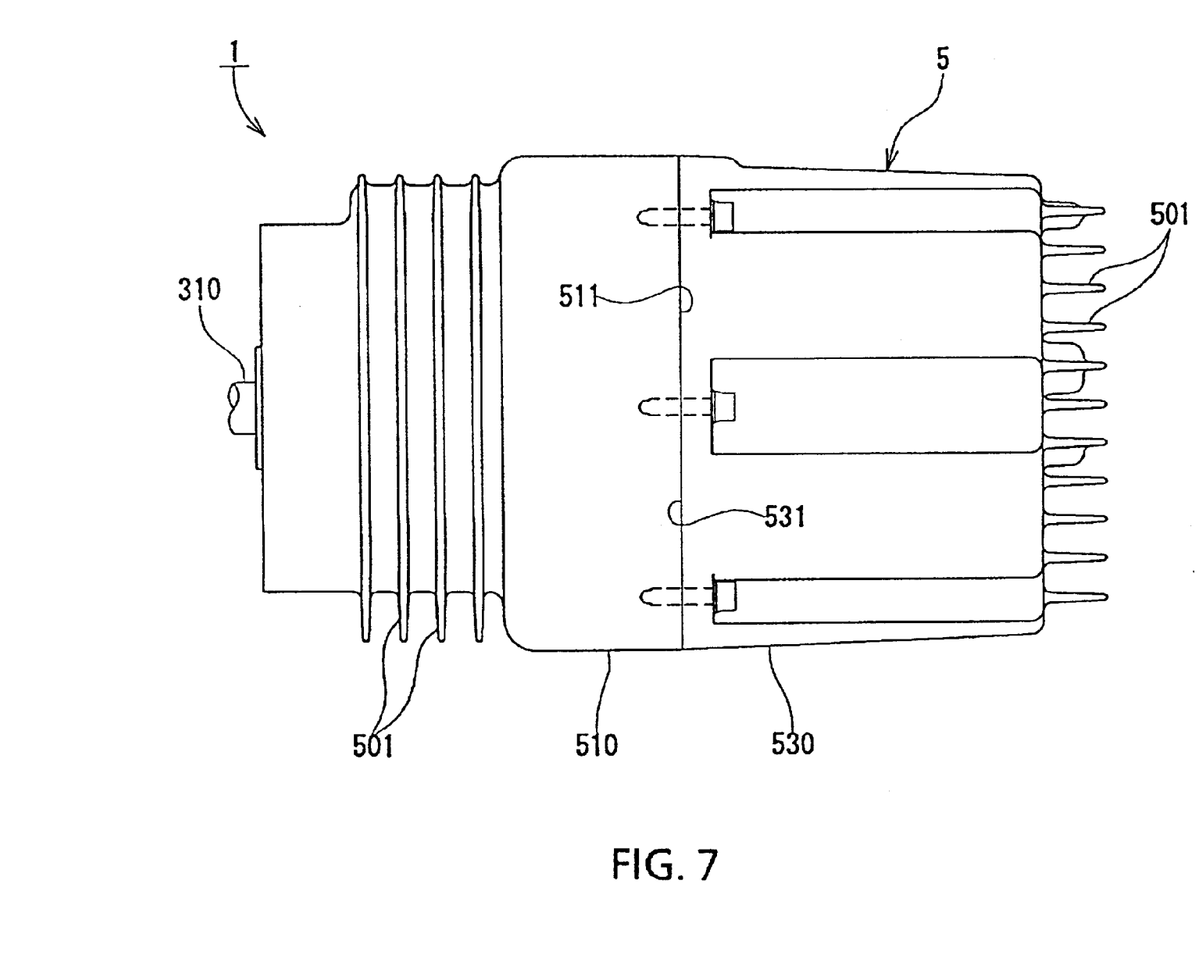
FIG. 7 is a side view showing a motor according to an embodiment of the present invention.
Figure 8:
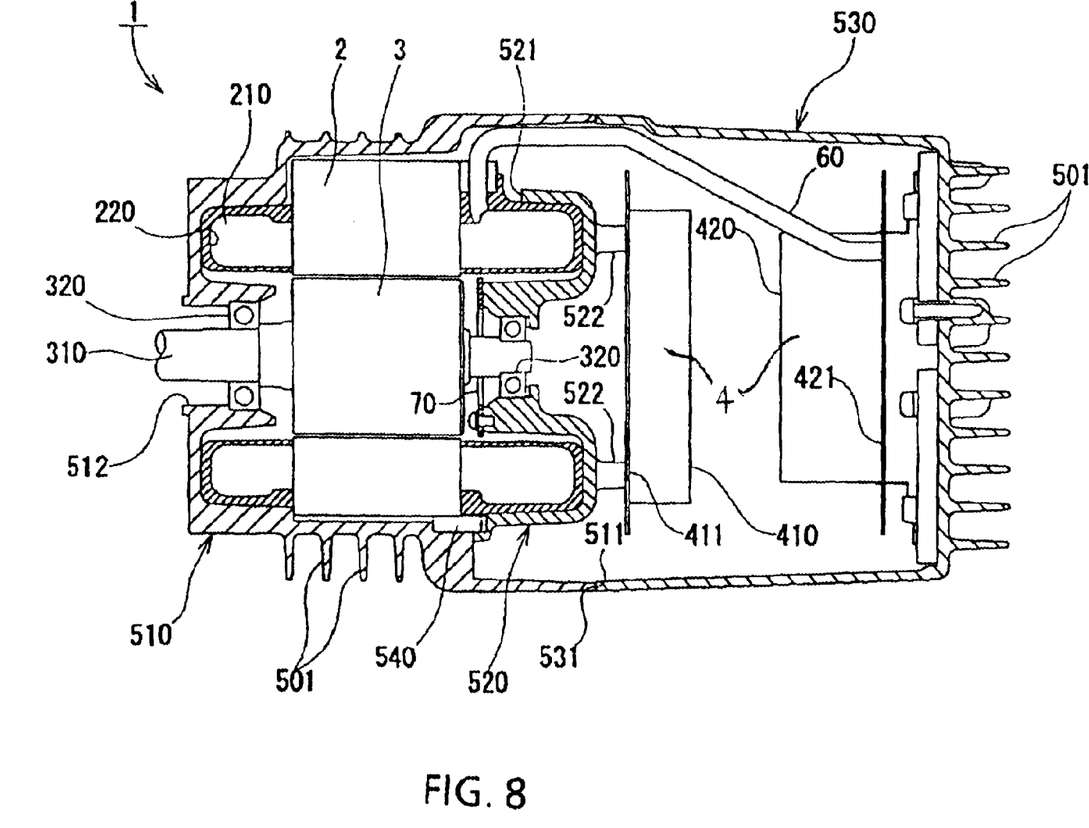
FIG. 8 is a side sectional view showing a motor according to the embodiment of the present invention.
Figure 9:
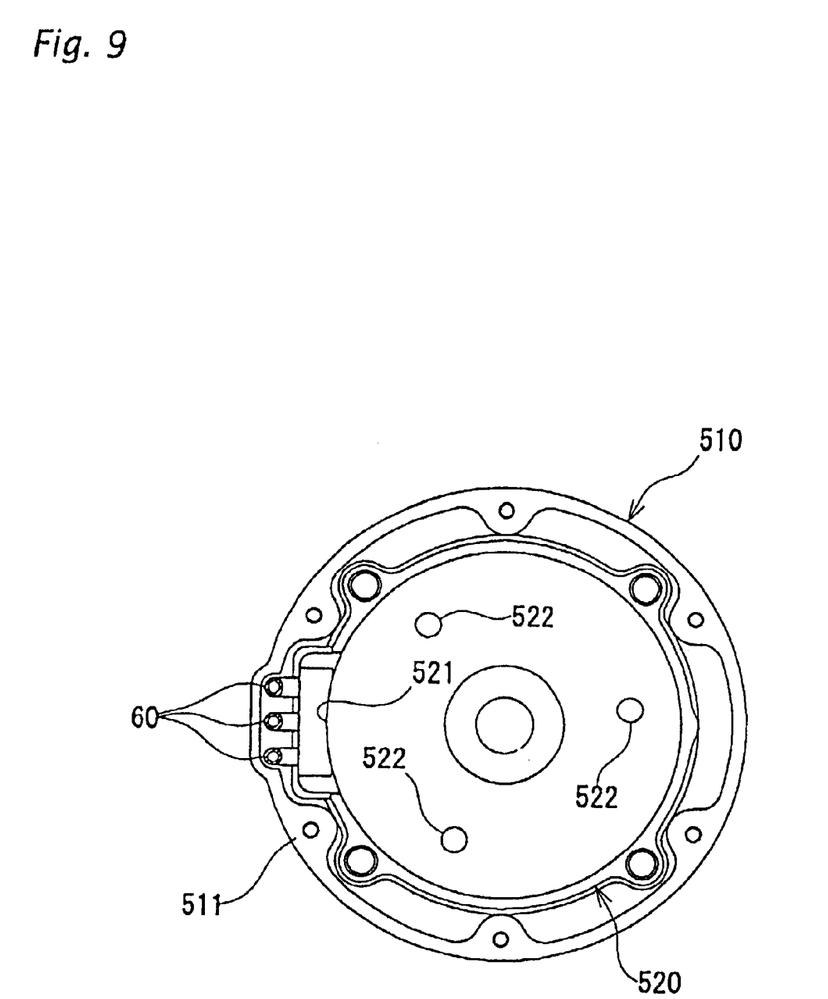
FIG. 9 is a front view showing a first casing member and a second casing member according to the embodiment of the present invention.

As shown in FIG. 7 to FIG. 9, the motor 1 of this embodiment is a DC motor or DC brushless motor, which is used for a motor engine for running and comprises the armature 2, the rotor 3 and a control section 40 for controlling the armature 2 held in the motor casing 5.

The armature 2 is provided around the rotor 3 with a small space between them, and the rotor 3 is rotated around an output shaft 310 supported by a bearing 320 when commutation is caused in a coil 210 of the armature 2 by the control section 40.

The motor casing 5 of this embodiment comprises a plurality of casing members formed of aluminum alloy or hard resin, and has a first casing member 510 and a second casing member 520 which cover the armature 2 and the rotor 3 with the bearing 320 respectively disposed, and a third casing member 530 for covering the control section 40.

And, the outer shell of the motor 1 is configured by assembling the first casing member and the third casing member, and its inside is divided by assembling the first casing member and the second casing member.

In this embodiment, the respective casing members 510, 520, 530 are assembled by screwing.

In the drawings, 540 indicates a turn stop member for preventing the first casing member 510 and the second casing member 520 from displacing.

Specifically, the motor 1 is formed by fitting the armature 2 having a substantially cylindrical shape into the first casing member 510, disposing the armature 3 at its center, screwing the first casing member and the second casing member 520, disposing the control 40 between the second casing member 520 and the third casing member 530, and screwing the first casing member 510 and the third casing member 530.

Coaxiality between the armature 2 and the rotor 3 is accurately maintained when the armature 2 is held in position between the first casing member 510 and the second casing member 520 and the output shaft 310 of the rotor 3 is supported by the bearings 320 disposed in the first casing member 510 and the second casing member 520.

The output shaft 310 of the rotor 3 is exposed from an opening 512 of the first casing member 510 and connected to outside.

And, seating surfaces 511, 531 which are designed to contact mutually are respectively formed on the ends of the first casing member 510 and the third casing member 530.

The seating surfaces 511, 531 are perpendicularly formed with respect to a direction is which the first casing member 510 and the third casing member 530 are screwed so to be mutually attached by pressure. Therefore, airtightness of the motor casing 5 can be secured without fail.

To secure the airtightness of the motor casing 5 more reliably, a groove or a stepped portion may be formed on the respective seating surfaces 511, 531 to mount a gasket, an O-ring or the like.

For the heat radiation of the motor 1, fins 501 for heat radiation are formed at appropriate positions of the casing 5, and a resin material 220 is placed around the coil 210 of the armature 2 to fill space between the armature 2 and the casing 5. The resin material 220 is solidified to shape by using a predetermined metal mold. Otherwise, it may be designed to form by injecting the resin into the casing 5 without using a metal mold. The resin material may be the same one as used in the aforesaid embodiment.

The control section 40 of this embodiment comprises a control circuit 410 to output a control signal according to an instruction transmitted from outside and a drive circuit 420 for supplying power to the armature 2 according to the control signal. The control circuit 410 is mounted on a substrate 411 supported by the second casing member 520, and the drive circuit 420 is mounted on a substrate 421 supported by the third casing member 530.

Wiring 60 for connecting the armature 2 with the drive circuit 421 of the control section 40 is passed through a notched through section 521 provided on the second casing member 520.

A plurality of projections 522 for supporting the substrate 411 of the control circuit 410 are formed on the second casing member 520, and the substrate 411 is supported by being screwed to the respective projections 522.

Besides, the control circuit 410 is connected to a sensor 70 for detecting a position of the rotor 3, and a control signal is output according to the position of the rotor 3 detected by the sensor 70. The sensor 70 has a ring shape to be inserted over the output shaft 310 of the rotor 3 and screwed to the second casing member 520.

As described above, in the motor of this embodiment, the motor casing has the first casing member and the second casing member for covering the armature and the rotor and respectively provided with the bearing for the rotor and the third casing member for covering the control section. The first casing member and the third casing member are assembled to form the outer shell of the motor, and the first casing member and the second casing member are assembled to divide the inside of the motor. And, the seating surfaces which are designed to contact mutually are respectively formed on the ends of the first casing member and the third casing member, so that the airtightness of the motor casing can be improved further more.

Specifically, the motor casing for holding the armature, the rotor and the control section is configured by assembling a plurality of members which respectively cover the armature, the rotor and the control, so that there are many joints which are exposed to outside, and it is disadvantageous in view of securing airtightness. In this embodiment, however, the joint between the first casing member and the second casing member is located inside of the joint between the first casing member and the third casing member, so that airtightness can be secured relatively easily.

And, the first casing member and the third casing member can be assembled accurately by virtue of the seating surfaces respectively formed thereon, and a gap in the joint can be eliminated completely.

Besides, in the motor of this embodiment, the through section, through which the wiring for connecting the armature and the control section is passed through, is placed in the second casing member, so that the wiring for connecting the armature and the control section within the motor casing can be disposed efficiently.

In addition, in the motor of this embodiment, the substrate of the control section is supported by the second casing member, so that the control section can be arranged efficiently in the motor casing.

Furthermore, in the motor of this embodiment, the sensor for detecting a position of the rotor is supported by the second casing member, so that the sensor for detecting a position of the rotor can be disposed efficiently in the motor casing.

Industrial Applicability

The present invention can improve connection accuracy of the output shaft of the rotor with the reduction gearing, the coaxiality between the armature and the rotor, and the heat radiation of the coil wound around the armature in a motor of high rotations and high torque, and it is especially suitable as a motor for electric vehicles.

What is claimed is:

1. A DC motor, comprising:
a motor casing composed of first, second, and third metal casing members, said first and third casing members forming an outer shell of said motor casing, said second casing member being disposed inside said outer shell, and each of said first and second casing members having bearings;
an armature disposed in said first and second casing members and having a coil;
a rotor disposed inside said armature and having an output shaft supported by said bearings of said first and second casing members;
a control section for controlling said armature, said control section disposed in said third casing member; and
a curable resin provided around said coil of said armature in said first and second casing members and having a high thermal conduction, said first and second casing members being provided with a turn stop member therebetween to prevent a displacement between said first and second casing members and secured to each other, and said first and third casing members having seating faces with irregular surfaces at edges thereof such that said irregular surfaces are exactly brought into contact with and secured to each other.

2. The DC motor according to claim 1, wherein said irregular surfaces are grooves.

3. The DC motor according to claim 1, wherein said irregular surfaces are steps.

4. The DC motor according to claim 1, wherein said second casing member is provided with a through-hole through which a wiring passes to connect said armature and said control section.

5. The DC motor according to claim 1 or 4, wherein said second casing member supports a substrate of said control section.

6. The DC motor according to claim 1 or 4, wherein said second casing member supports a sensor for detecting a position of said rotor.

7. The DC motor according to claim 5, wherein said second casing member supports a sensor for detecting a position of said rotor.

* * * * *